Sept. 27, 1932. J. E. MAIR 1,880,098
SWIVEL CONNECTER FITTING FOR CONDUITS AND THE LIKE
Filed July 1, 1930 2 Sheets-Sheet 1
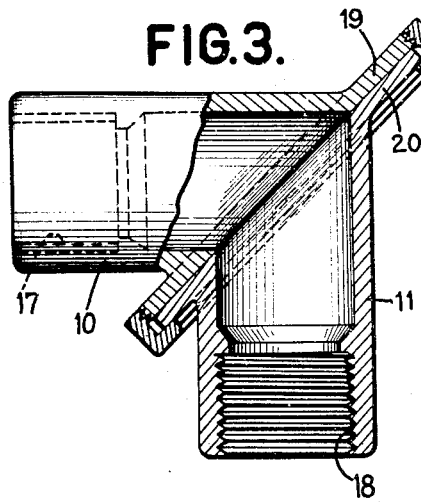
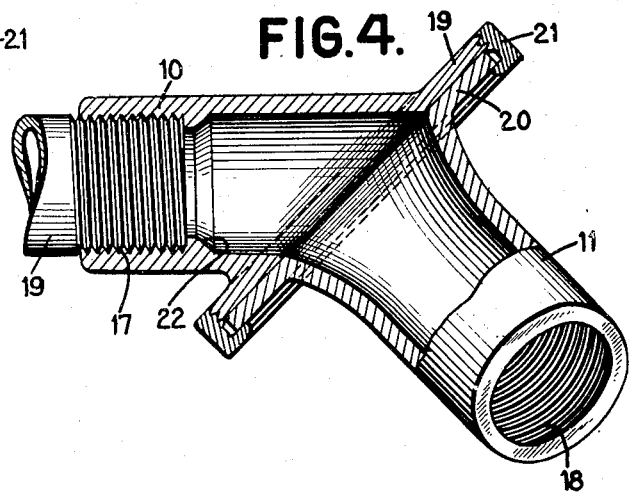
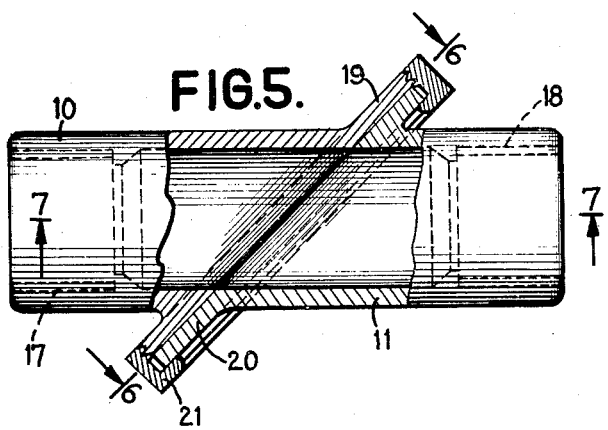
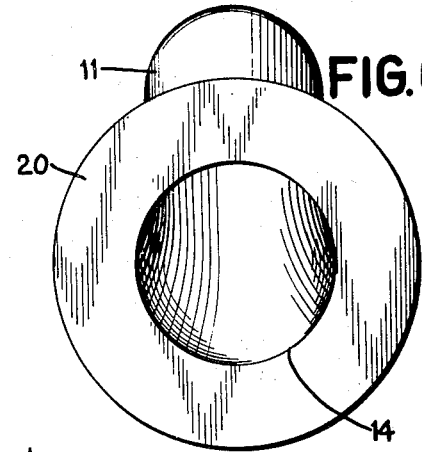
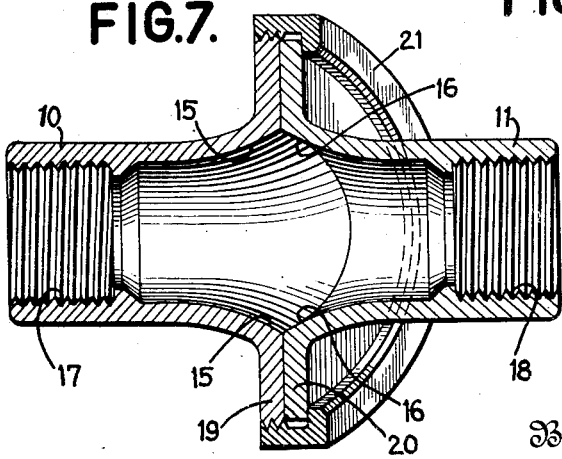
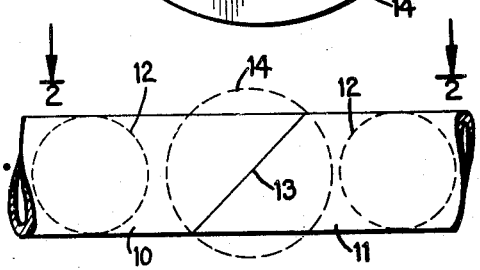
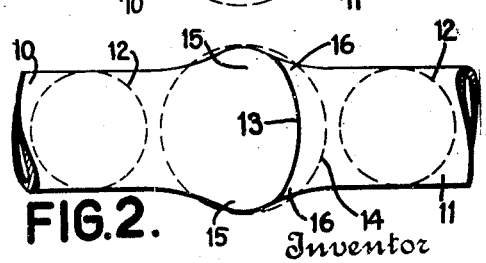

Sept. 27, 1932.    J. E. MAIR    1,880,098
SWIVEL CONNECTER FITTING FOR CONDUITS AND THE LIKE
Filed July 1, 1930    2 Sheets-Sheet 2
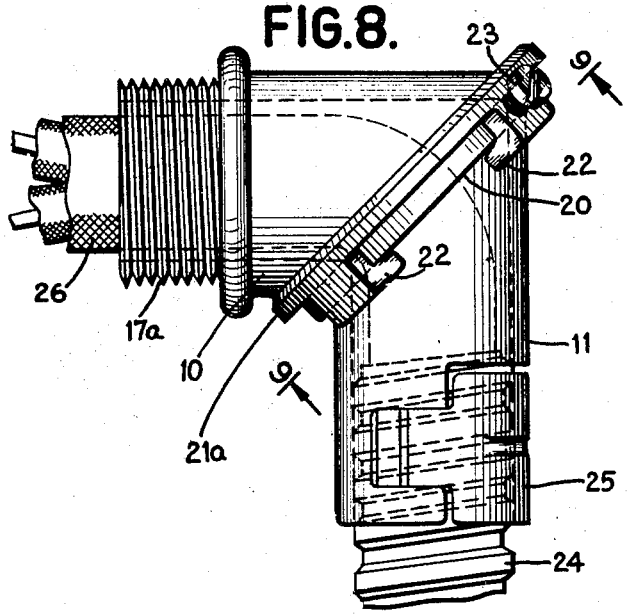
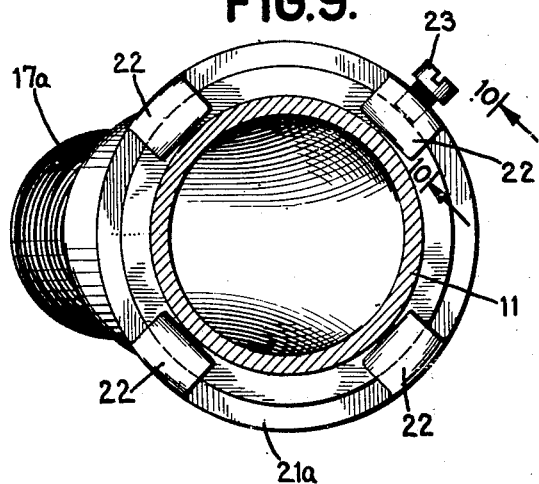
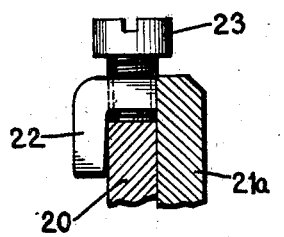

Patented Sept. 27, 1932

1,880,098

UNITED STATES PATENT OFFICE

JOHN E. MAIR, OF MARS, PENNSYLVANIA, ASSIGNOR TO NATIONAL ELECTRIC PRODUCTS CORPORATION, OF NEW YORK, N. Y., A CORPORATION OF DELAWARE

SWIVEL CONNECTER FITTING FOR CONDUITS AND THE LIKE

Application filed July 1, 1930. Serial No. 465,173.

This invention relates to connections for conduits or cables used in electrical wiring and more particularly relates to angle connections.

In electrical wiring it is the common practice in connecting lengths of conduits or in connecting conduits to outlets, to use connecters of various set degrees of angularity and in other cases it is the practice to bend the conduit or cable to conform to the desired angle which the connection is desired to have. The former practice requires a great multiplicity of fittings and the latter practice is difficult and usually requires a great deal more space to provide for bending than is required when a fitting is utilized.

The present invention has for its object the provision of a connecter which can be set to any angle from 90 degrees to a straight line and thus provide one fitting which will connect conduits or cables at any desired angle within this range.

Further and other objects of the present invention will be hereinafter set forth in the accompanying specification and claims and shown in the drawings which by way of illustration show preferred embodiments of the invention.

In the drawings:

Figures 1 and 2 show diagrammatically the principal elements of a connecter fitting incorporating the present improvements;

Fig. 2 is viewed at right angles to Fig. 1 as indicated by the arrows 2—2;

Fig. 3 shows the connecter fitting displaced to provide for a 90 degree connection;

Fig. 4 shows the fitting providing approximately a 30 degree connection;

Fig. 5 shows the fitting with its parts displaced to provide for a straight through connection;

Fig. 6 is a detail view taken substantially on lines 6—6 of Fig. 5, but with the clamping ring removed;

Fig. 7 is a sectional view of the connecter shown in Fig. 5, the section being taken on lines 7—7 of that figure;

Fig. 8 is a detailed view of a modification in which a different form of securing means is used;

Fig. 9 is a sectional view of Fig. 8 taken on lines 9—9; and

Fig. 10 is a further detail taken on lines 10—10 of Fig. 9.

Referring to the drawings, the underlying principles of the connecter fitting can be best understood from these diagrammatic views. The connecter elements comprise two abutting parts 10 and 11 which have a transverse cross-section as indicated by the circles 12—12. The parts 10 and 11 abut each other on an intersecting plane 13 which is disposed at an angle to the longitudinal axis of the openings in the parts 10 and 11. Preferably 13 is at an angle of 45 degrees. 14 is a circle, the diameter of which is that of the length of the plane 13 as shown in Fig. 1.

To provide for swiveling of the part 10 with respect to 11, parts 10 and 11 at the lateral sides adjacent plane 13 are flared as indicated at 15 and 16 in Fig. 2. The extent of such flares is such that the intersecting points of flares 15 and 16 project out from the sides of the elements 10 and 11 to such an extent that these intersecting points just intercept the circle 14. It will be understood that circle 14 is larger than circle 12. This construction provides for complete swiveling movement of part 10 with respect to part 11 and also avoids excessive material at the intersecting point, it being noted that there is no flare shown in Figs. 1 and 5 at all and such flare is only disposed at the two opposite lateral sides as shown in Fig. 2.

Referring now to Fig. 3 parts 10 and 11 are here shown as provided with interiorly threaded female couplings 17 and 18. In order to secure the two elements of the coupling together, flanged portions 19 and 20 are provided. These flanges are preferably exteriorly threaded to receive a clamping ring 21. It will be understood that by loosening the clamping ring, parts 10 and 11 can be swiveled to any desired angle and thereafter the clamping ring can be tightened up to secure the abutting elements in the desired relative angular relation.

Fig. 4 requires no detailed description, this view shows a section of conduit 19 introduced into the threaded coupling 17 and abutting shoulder 22 as shown.

Fig. 5 shows a straight through connection, it being noted that the interior bore of element 11 is in alignment with the bore of element 10 in this figure. This figure corresponds to diagrammatic view Fig. 1.

Fig. 7 shows the connecters in the straight line relation of Fig. 5, but the view is taken at right angles to show the laterally opposite interior flared portions 15 and 16.

Referring now to Figs. 8, 9 and 10 here a different form of securing means is provided for securing element 10 to element 11. According to this embodiment the flange 19 is exteriorly threaded and the periphery of flange 20 is unthreaded as shown in Fig. 8. In lieu of utilizing the clamping ring as heretofore, flange element 21a is provided with inwardly turned fingers 22 which fingers engage back of the flange 20 as shown. To secure the parts together a suitable set screw 23 may be used to clamp against the periphery of flange 20. In Fig. 8 the swivel connecter is shown as receiving an armored cable 24, the cable being clamped by the usual wing clamp 25. 26 represents the conducters which emerge from the armored cable 24 and pass out through the element 10. Element 10 in lieu of having a female coupling portion such as 17 is provided with an exteriorly threaded coupling portion 17a.

Preferably the angle of plane 13 with respect to the axis of the two elements is 45 degrees. However, the invention is not limited to such an angle, as other angles can be used as well. However, the most satisfactory arrangement is provided when the angle is 45 degrees since with this relation of the abutting parts, the angle of swing may be up to 90 degree without excessive size of the flared portions 15—16.

By providing the flared portions 15 and 16 upon two opposite lateral sides only of the elements 10 and 11 and omitting such flare on the opposite sides shown in Fig. 1, a construction is provided with continuing inner walls at the top and bottom of the fitting as shown in Fig. 5. This arrangement secures compactness of construction.

What I claim is:

1. A connecter fitting for connecting conduits, cables and the like in an electric wiring system, said connecter comprising two elements abutting together in a plane disposed at an angle to the longitudinal axis of the opening through each fitting, said fitting walls being flared out laterally upon opposite lateral sides only of a transverse cross-section of the fitting to provide a circular configuration for the interior of the abutting fittings, and means for securing the two elements of the fitting together.

2. A connecter fitting for providing a universally swiveling connection between conduits, cables and the like in an electrical wiring system, said fitting comprising two parts adapted to abut each other at an angle to the longitudinal axis of the opening through each element, each element being provided with a flared portion upon two opposite lateral sides only of a transverse cross-section of the fitting to provide for circular mating with the other fitting, each element being further provided adjacent the flared point with an outwardly extending flange portion, and means cooperating with the flange portions for securing one element to the other at any desired angle between the elements.

In testimony whereof I hereto affix my signature.

JOHN E. MAIR.